(12) United States Patent
Linnell et al.

(10) Patent No.: US 10,399,272 B2
(45) Date of Patent: Sep. 3, 2019

(54) CONTINUOUS PULL THREE-DIMENSIONAL PRINTING

(71) Applicant: X Development LLC, Mountain View, CA (US)

(72) Inventors: Jeff Linnell, San Francisco, CA (US); Jonathan Proto, San Francisco, CA (US); Brandon Kruysman, San Francisco, CA (US); Steven Moody, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 181 days.

(21) Appl. No.: 15/513,927

(22) PCT Filed: Aug. 26, 2015

(86) PCT No.: PCT/US2015/046883
§ 371 (c)(1),
(2) Date: Mar. 23, 2017

(87) PCT Pub. No.: WO2016/053512
PCT Pub. Date: Apr. 7, 2016

(65) Prior Publication Data
US 2017/0297264 A1 Oct. 19, 2017

Related U.S. Application Data

(60) Provisional application No. 62/059,521, filed on Oct. 3, 2014.

(51) Int. Cl.
*B29C 41/12* (2006.01)
*B29C 64/379* (2017.01)
(Continued)

(52) U.S. Cl.
CPC .......... *B29C 64/379* (2017.08); *B29C 64/124* (2017.08); *B29C 64/129* (2017.08);
(Continued)

(58) Field of Classification Search
CPC ..... B29C 41/12; B29C 64/124; B29C 64/129; B29C 64/135; B29C 67/244; B29C 2791/008
(Continued)

(56) References Cited

U.S. PATENT DOCUMENTS 5,545,367 A 8/1996 Bae et al.
9,808,992 B1 * 11/2017 Linnell ................. B29C 64/135
(Continued)

FOREIGN PATENT DOCUMENTS

DE 4102260 7/1992 .................... 264/401
DE 10 2013 102377 A1 9/2014
(Continued)

OTHER PUBLICATIONS

International Preliminary Report on Patentability issued in International Application No. PCT/US2015/046883, dated Apr. 13, 2017, 12 pages.
(Continued)

*Primary Examiner* — Leo B Tentoni
(74) *Attorney, Agent, or Firm* — Fish & Richardson P.C.

(57) ABSTRACT

Described herein are three-dimensional (3D) printer systems and methods, which may provide for "continuous pull" 3D printing. An illustrative 3D printer includes: a resin container, a base plate, a light source arranged below the resin container and operable to cure resin in the resin container; and a control system operable to: (a) receive model data specifying a 3D structure; (b) determine 2D images corresponding to layers of the 3D object; and (c) generate control signals to operate the light source and the base plate to
(Continued)

sequentially form the layers of the 3D object onto the base plate, wherein the base plate moves a formed portion of the 3D object upward after formation of each layer, and wherein at least a surface of a formed portion of the 3D object remains in contact with the resin in the resin container throughout the formation of the layers of the 3D object.

9 Claims, 13 Drawing Sheets

(51) Int. Cl.
  *B29C 67/24* (2006.01)
  *B33Y 10/00* (2015.01)
  *B33Y 30/00* (2015.01)
  *B33Y 50/02* (2015.01)
  *B29C 64/245* (2017.01)
  *B29C 64/393* (2017.01)
  *B29C 64/286* (2017.01)
  *B29C 64/129* (2017.01)
  *B29C 64/124* (2017.01)

(52) U.S. Cl.
  CPC .......... *B29C 64/245* (2017.08); *B29C 64/286* (2017.08); *B29C 64/393* (2017.08); *B29C 67/244* (2013.01); *B33Y 10/00* (2014.12); *B33Y 30/00* (2014.12); *B33Y 50/02* (2014.12); *B29C 2791/008* (2013.01)

(58) Field of Classification Search
  USPC .................. 264/69, 71, 298, 401, 442, 443
  See application file for complete search history.

(56) References Cited

U.S. PATENT DOCUMENTS

| | | | | |
|---|---|---|---|---|
| 2002/0171177 | A1* | 11/2002 | Kritchman | B29C 64/112 264/401 |
| 2004/0148048 | A1* | 7/2004 | Farnworth | B29C 64/135 700/119 |
| 2014/0339741 | A1* | 11/2014 | Aghababaie | B29C 64/124 264/401 |
| 2015/0307385 | A1* | 10/2015 | Klein | C03B 25/02 65/29.11 |
| 2016/0254669 | A1* | 9/2016 | Zhang | B33Y 30/00 363/35 |
| 2017/0028618 | A1* | 2/2017 | Robeson | B29C 64/124 |
| 2017/0274556 | A1* | 9/2017 | Gardiner | B29C 64/106 |

FOREIGN PATENT DOCUMENTS

| | | |
|---|---|---|
| EP | 0 403 146 A2 | 12/1990 |
| GB | 2 477 828 A | 8/2011 |

OTHER PUBLICATIONS

"China Science and Technology Development Report (2012)," Jan. 31, 2012, Ministry of Science and Technology of the Peoples Republic of China, Science and Technology Literature Press, specifically p. 163 (English Translation of p. 163) 6 pages.

Bi Yuji "Machine Tool Numerical Control Technology," Jul. 31, 2013, Mechanical Industry Press, (English Translation of relevant pp. 31-35) 15 pages.

CN Office Action issue din Chinese Application No. 201580059723.1, dated Sep. 5, 2018, 26 pages (with English Translation).

PCT International Search Report and Written Opinion, PCT International Application No. PCT/US2015/046883, dated Jan. 19, 2016, 16 pages.

CN Office Action in Chinese Appln No. 201580059723.1, dated Mar. 7, 2019, 24 pages (with English translation).

Ep Office Action in European Appln. No. 15757630.Jul. 1019, dated Jun. 5, 2019, 4 pages.

* cited by examiner

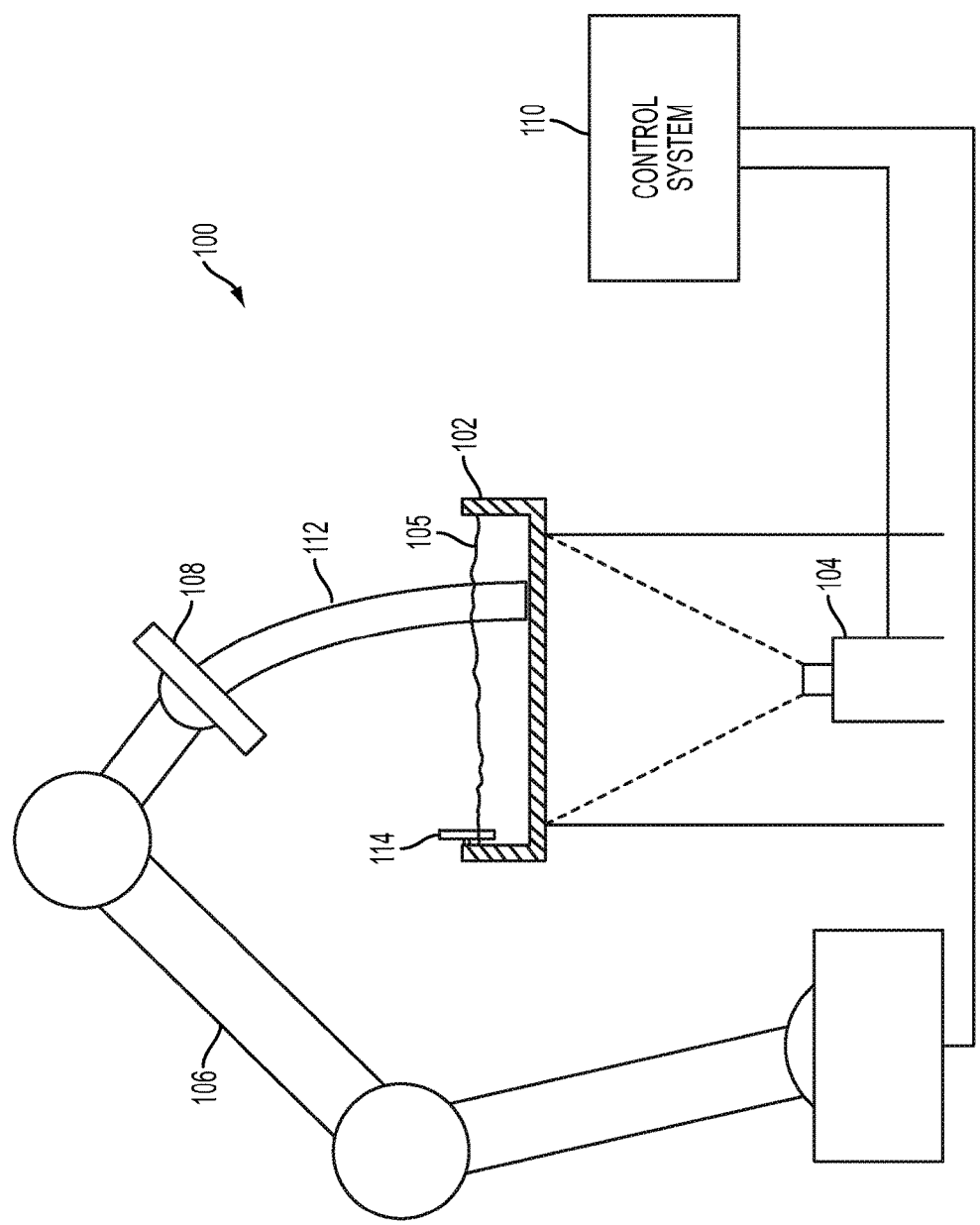

200~# CONTINUOUS PULL THREE-DIMENSIONAL PRINTING

CROSS REFERENCE TO RELATED APPLICATIONS

The present application is a national stage entry of PCT/US2015/046883, filed Aug. 26, 2015, which claims priority to U.S. Provisional Patent Application Ser. No. 62/059,521 filed Oct. 3, 2014, both of which are incorporated herein by reference for all purposes.

BACKGROUND

Three-Dimensional ("3D") printing is an additive manufacturing process in which successive layers of material are laid down on top of each other to form a solid 3D object. Over time, various types of 3D printing process have been developed, including extrusion-based 3D printing (e.g., fused deposition modeling (FDM)), and processes based on light polymerization, such as stereolithography (SLA) and digital light processing (DLP), among others.

In stereolithography processes, a 3D structure is built up one layer at a time, with each layer being formed by exposing a photo-reactive resin to an ultraviolet (UV) light source that cures the resin. Note that stereolithography may also be referred to as optical fabrication, photo-solidification, and/or solid free-form fabrication and solid imaging.

More specifically, in a typical stereolithography process, a digital 3D model of an object is created by a user via the software interface of a 3D printing application. The 3D printing application then slices the 3D model with a set of horizontal planes. Each slice of the 3D model can then be converted to a two-dimensional mask image, such that the 3D model is represented as a sequence of two-dimensional mask images, which each outline the shape of the corresponding layer from the 3D model. The mask images sequentially projected onto a photo-curable liquid or powders resin surface while light is projected onto the resin to cure it in the shape of the layer. Alternatively, instead of using masks, each slice of the 3D model may be representing by a two-dimensional image in the shape of the slice, so that a projector can project a sequence of such two-dimensional images onto the resin surface to form an object corresponding to the digital 3D model.

SUMMARY

Example embodiments relate to three-dimensional (3D) printing systems and methods. 3D Printing using stereolithography can be a time consuming process. More specifically, in a stereolithography process, much of the time is spent removing the resin object from the vat of resin after curing each layer, agitating the resin to break the surface tension, and then dipping the cured portion of the resin object back into the vat to cure the next layer. Example embodiments may help to reduce the time required for 3D printing via "continuous pull" 3D printing systems and processes. More specifically, example systems and methods may help to provide for printing of 3D objects using stereolithography, without requiring that the in-progress object (i.e., the layers of resin that have already been cured) be completely removed from the liquid resin before each layer is cured.

In one aspect, an example 3D printer system includes: a resin container arranged to hold liquid resin; a base plate; a light source arranged below the resin container, wherein the light source is operable to emit electromagnetic radiation that causes a portion of the resin in the resin container to cure; and a control system. The control system is operable to: (a) receive model data specifying a three-dimensional structure; (b) determine a plurality of two-dimensional images corresponding to a plurality of layers of the three-dimensional object; and (c) based at least in part on the specified structure, generate control signals to operate the light source and the base plate to sequentially form the plurality of layers of the three-dimensional object onto the base plate, wherein the base plate moves a formed portion of the three-dimensional object upward after formation of each layer, and wherein at least a surface of a formed portion of the three-dimensional object remains in contact with the resin in the resin container throughout the formation of the plurality of layers of the three-dimensional object.

In another aspect, a computer-implemented method for controlling a 3D printer is disclosed. The method involves: (a) receiving model data describing a three-dimensional object; (b) determining a plurality of two-dimensional images corresponding to a plurality of layers of the three-dimensional object; (c) initially positioning a base plate such that a surface of the base plate contacts resin in a resin container; and (d) operating the light source and the base plate to sequentially form the plurality of layers of the three-dimensional object onto the base plate, wherein the base plate moves a formed portion of the three-dimensional object upward after formation of each layer, and wherein at least a surface of the formed portion of the three-dimensional object remains in contact with the resin in the resin container throughout the formation of the plurality of layers of the three-dimensional object.

In a further aspect, another computer-implemented method for controlling a 3D printer is disclosed. The method involves: (a) receiving model data specifying a three-dimensional structure; (b) determining a sequence of layers corresponding to the three-dimensional structure, wherein each layer has a corresponding shape, and wherein the plurality of layers comprise at least a first layer and a second layer; (c) positioning a base plate such that a first surface of the base plate is positioned at a printing interface within liquid resin in a resin container; (d) operating a light source to project a first shape of the first layer onto the first surface of the base plate to cure the first layer of the three-dimensional structure; (e) after curing the first layer: (i) vibrating the resin container, and (ii) moving the base plate upward such that a first surface of the first layer is positioned at the printing interface; and (f) operating a light source to project a second shape of the second layer to the first surface of the first layer and cure the second layer of the three-dimensional structure, wherein the first surface of the first layer remains in contact with resin in the resin container between the curing of the first layer and the curing of the second layer.

In an additional aspect, another computer-implemented method for controlling a 3D printer is disclosed. The method involves: (a) receiving model data specifying a three-dimensional structure to be formed from layers of resin, wherein each layer is formed by curing liquid resin, wherein a resin container holds a volume of the liquid resin and a volume of a second liquid having a different specific gravity than the resin, such that the second liquid separates from the liquid resin and provides a printing interface between the volume of liquid resin and the volume of the second liquid; (b) positioning a base plate such that a lower surface of the base plate is positioned at the printing interface; (c) operating a light source to project a first shape corresponding to a first layer to the printing interface to cure a first layer of the three-dimensional structure; (d) after curing the first layer, moving the base plate upward such that a lower surface of the first layer is positioned at the interface; and (e) operating a light source to project a second shape corresponding to a second layer to the printing interface to cure a second layer of the three-dimensional structure, wherein the lower surface of the first layer remains in contact with the liquid resin in the resin container between the curing of the first layer and the curing of the second layer.

In a further aspect, another computer-implemented method for controlling a 3D printer is disclosed. The method involves: (a) receiving model data specifying a three-dimensional structure; (b) determining a plurality of shapes corresponding to a plurality of layers of the three-dimensional structure, wherein edges of each layer have a predetermined two-dimensional pattern, and wherein the plurality of shapes comprises at least a first shape corresponding to a first layer and a second shape corresponding to a second layer; (c) positioning a base plate such that a surface of the base plate contacts resin in a resin container; (d) operating a light source to project the first shape onto the surface of the base plate and form the first layer of the three-dimensional structure by curing resin at an interface between the surface of the base plate and the resin in the resin container; (e) after forming the first layer, moving the base plate upward such that a lower surface of the first layer contacts resin in the resin container at the printing interface; and (f) operating a light source to project the second shape onto the surface of the first layer and form the second layer of the three-dimensional structure by curing resin at an interface between the surface of the first layer and the resin in the resin container, wherein the surface of the first layer remains in contact with resin in the resin container between the formation of the first layer and the formation of the second layer.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 1A shows a three-dimensional printer system, according to an example embodiment.

DETAILED DESCRIPTION

Figure 1B:
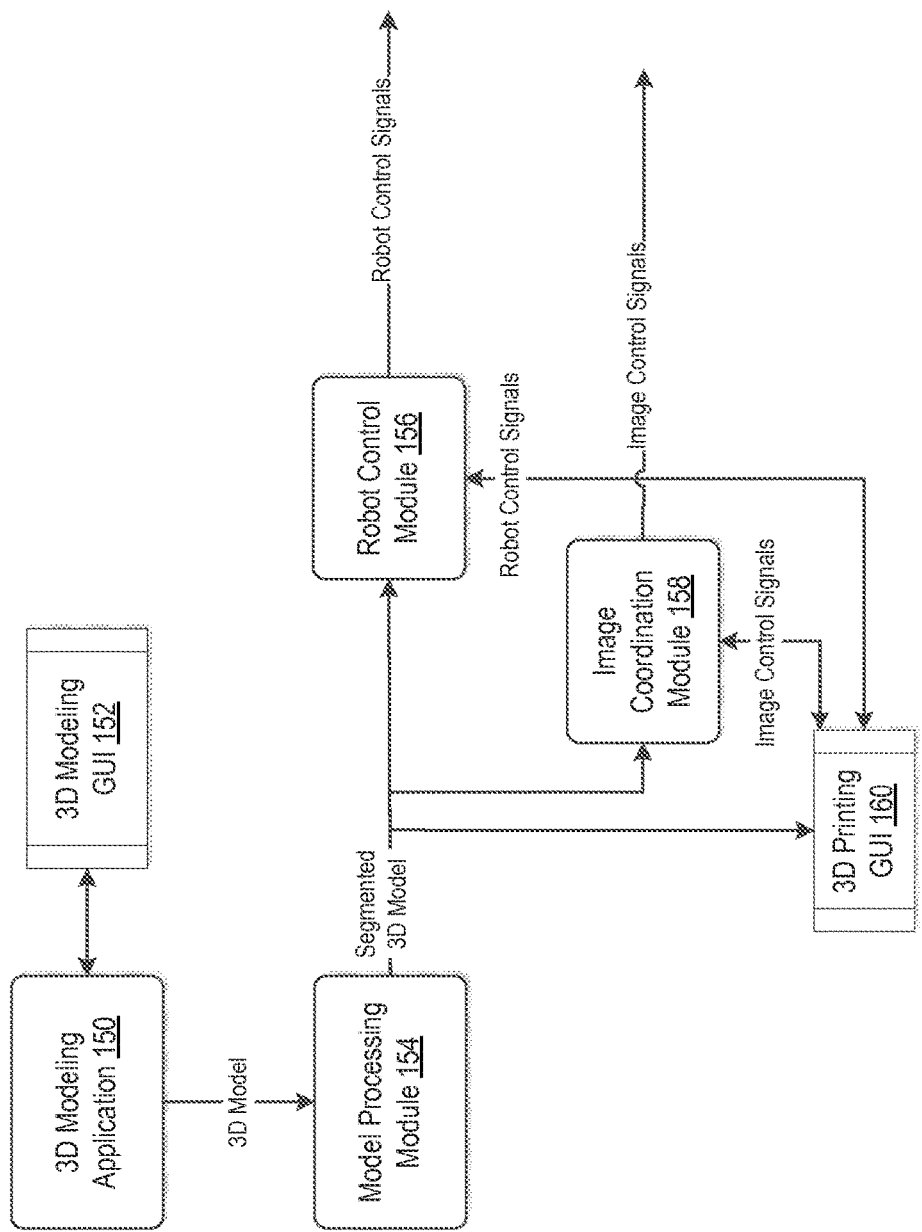
FIG. 1B shows example program logic modules for interfacing with and controlling a three-dimensional printer system.
Figure 1D:
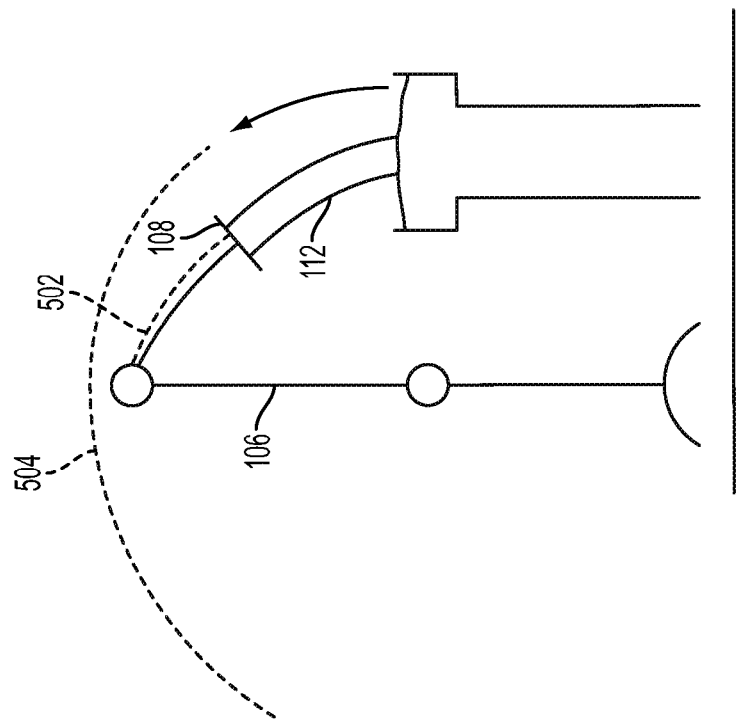
FIGS. 1C to 1F illustrate the movement of a robotic arm during the process of three-dimensional printing an object, according to an example embodiment.
Figure 1C:
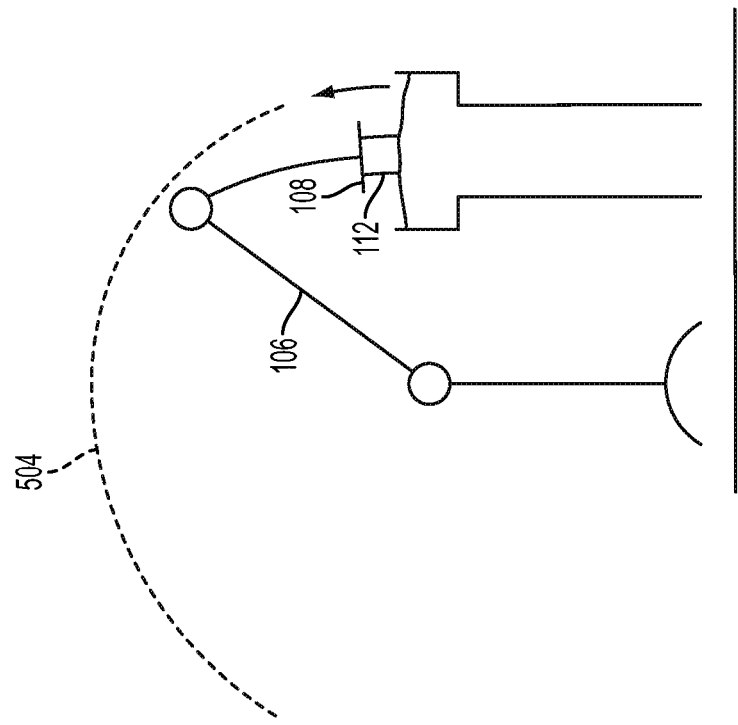
Figure 1E:
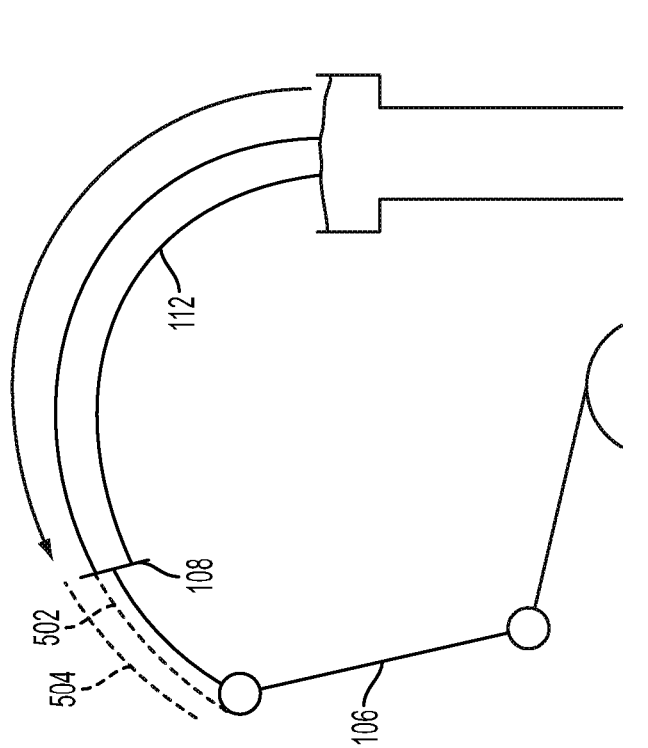
Figure 1F:
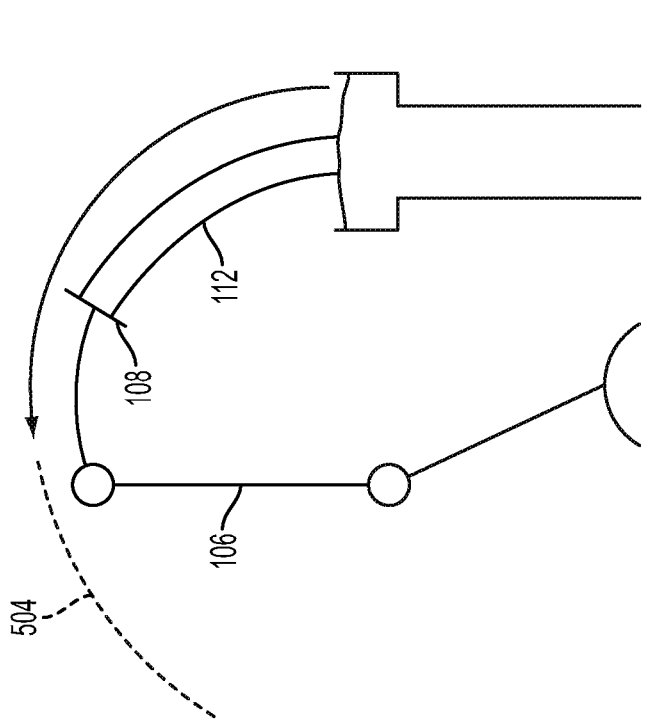

The following detailed description describes various features and functions of the disclosure with reference to the accompanying Figures. In the Figures, similar symbols typically identify similar components, unless context dictates otherwise. The illustrative apparatuses described herein are not meant to be limiting. It should be understood that certain aspects of the disclosure can be arranged and combined in a wide variety of different configurations, all of which are contemplated herein.

I. OVERVIEW

As noted above, much of the time in stereolithography 3D printing is spent removing the resin object from the vat of liquid resin after curing each layer, agitating the resin to break the surface tension, and then dipping the resin object back into the vat to cure the next layer. Example embodiments may help to reduce the time required for 3D printing via a continuous pull process.

In some embodiments, a liquid printing interface may be utilized in a continuous-pull 3D printing process. In such embodiments, a 3D printer may use stereolithography, and may have a base plate that is held above a vat (e.g., a resin container) of liquid resin and a projector positioned below the vat. The vat may be filled with a liquid resin and another liquid having a different specific gravity than the liquid resin. For example, the resin container may be filled with liquid resin and a second liquid that is more dense (e.g., that has a higher specific gravity) than the liquid resin, such as glycerin. Thus, the liquid resin and second liquid may naturally separate, and the liquid resin may float above the second liquid due to the comparatively lower specific gravity of the liquid resin. Further, a planar printing interface may be provided in the plane where the separation of the liquid resin and the second liquid occurs.

Further, the viscosity of the second liquid (e.g., glycerin) may be greater than the viscosity of the liquid resin in the resin container. Thus, when a layer of resin is cured the at the printing interface between the base plate and at the upper surface of the volume of the second liquid, the higher viscosity of the second liquid as compared to the liquid resin may allow for the cured layer to be easily removed from the printing interface, which may in turn form smoother edges in the resulting 3D-printed object.

In some embodiments, a 3D printer may be configured to implement a continuous-pull process by vibrating the resin container in between the curing of consecutive layers, which may improve the results of a continuous-pull 3D printing process (e.g., with smoother surfaces in the resulting 3D-printed object).

In some embodiments, a 3D printer may be configured to implement a continuous-pull process by adding a pattern, such as pixels or a serration, to the edges of each image in a full-frame image stereolithography where the object being printed does not need to be removed from the liquid resin after each layer is cured. Such an edge pattern may be added to each layer by modifying the image used to cure the layer to have the edge pattern.

II. ILLUSTRATIVE 3D PRINTERS

3D Printers that are configured for continuous-pull 3D printing processes may take various forms. Some examples of such 3D printers are described below. However, it should be understood that the example 3D printers described herein are not intended to be limiting, and that other types of 3D printers and variations on the 3D printers described herein are also possible.

In some embodiments, a 3D printer system may include a robotic arm or another robotic device that suspends a base plate above a photo-reactive resin. The robotic arm initially submerges the base plate in the resin while a projector below the resin projects an image towards the photo-reactive resin to form the first layer on the base plate. The robotic arm then moves the base plate, and the first layer, as a subsequent layer is cured on the first layer. This process is then repeated as the object is built up layer by layer.

Further, in some embodiments, the robotic arm may be configured to move the base plate, and thus the object being printed thereon, with two or more degrees of freedom. This, in turn, may allow for the creation of layers that are "wedge-shaped," or in other words, that have opposing surfaces in non-parallel planes. Accordingly, some or all layers may be non-parallel to an adjacent layer. Configured as such, an example 3D printing system may allow for the creation of objects that are much larger than those that can be created in a 3D printer where the build volume is constrained, e.g., by the dimensions the resin pan.

The ability to vary the angle of layers in a 3D-printed object may allow for flexibility in structural design and/or greater control of the structural characteristics of 3D-printed objects. For instance, by changing the orientation of layers within a 3-D printed object, it may be possible to intelligently control characteristics of the object such as structural rigidity, elasticity, etc.

Additionally or alternatively, a 3D printer system with a base plate mounted to a robotic arm may allow for creation of objects with less temporary support structures than might otherwise be needed during the 3D printing process. For example, 3D printing of an object such as an arch (or another object with an overhang) might otherwise require that support structures be created beneath the arch, in order to support the arch during the printing process. When such support structures need to be removed after 3D printing an object, this can add time and/or manual labor to the process, and can result in imperfections at locations where supports are removed. However, in some embodiments, the base plate suspends an in-progress object from above during the printing process, which in some cases may remove the need to create support structures below the object.

FIG. 1A shows a 3D printer system 100 according to an example embodiment. The 3D printer system 100 includes a resin container 102, as well as a light source 104 arranged below the resin container. The light source 104 is operable to emit electromagnetic radiation towards the resin container in a controlled manner, such that the electromagnetic radiation cures the resin 105 in the resin container 102. Further, 3D printer system 100 includes a robotic arm 106 having the base plate 108 attached thereto.

The robotic arm 106 is operable to position the base plate 108 above the resin container 102, and to move the base plate 108 with respect to the resin container 102 with at least two degrees of freedom (and more specifically, in the illustrated example, with six degrees of freedom). As a result, the build volume of the 3D printer system 100 extends beyond the edges of the resin container.

In an example embodiment, the robotic arm 106 may be an articulated robot with three rotary joints, allowing the robotic arm 106 six degrees of freedom. However, more or less rotary joints are possible. Further, note that that a 3D printer system can mount a base plate to various types of robotic devices, and is not limited to robotic arms. For example, the base plate could be mounted to a two-axis head unit, or a robotic arm having four degrees of freedom. Other examples are also possible.

The base plate 108 may be implemented as an end effector on robotic arm 106. Further, robotic arm 106 may be programmable, such that a set of control instructions can be generated to moves the robotic arm 106 in a manner that results in creation of a particular object on base plate 108.

A base plate 108 may vary in size and/or shape, depending upon the particular embodiment. Further, the base plate 108 may be formed from various materials or combinations of materials, depending upon the particular embodiment. Generally, the surface of the base plate 108 may be formed from any material to which a base layer of resin will adhere when cured. Further, since the base plate holds the object being printed from above, the size, the weight distribution, the shape, and/or the adhesive properties of the base plate's surface that faces the resin container, may be designed so as to provide support for certain loads (e.g., so that the base plate can hold objects up to a certain weight, shape, and/or size).

The resin container 102 may be of various sizes and/or shapes, depending upon the particular embodiment. Further, the bottom of the resin container 102 may be formed from any material that allows for transmission of electromagnetic waves from the appropriate region of the electromagnetic spectrum for curing the resin 105, such that the appropriate electromagnetic waves emitted by projector 104 can pass through the bottom of the resin container 102 to cure the resin 105. For example, if resin 105 is a ultraviolet-curable photopolymer, then the bottom of resin container 102 may be formed from any material that ultraviolet waves can pass through. Other examples are possible.

Further, note that example embodiments are not limited to the stereolithography techniques described herein. In some embodiments, a laser could be used to cure the resin instead of a UV light source. Further, various types of resins may be utilized, including liquid and powdered photo-curable resins, without departing from the scope of the invention. Other variations on the embodiments described herein are also possible.

The projector 104 may take various forms, depending upon the particular implementation. In general, the projector may be any controllable light source that emits electromagnetic waves from the appropriate region of the electromagnetic spectrum for curing the resin 105. In some embodiments, the projector 104 may be controllable to emit electromagnetic radiation (e.g., UV light) that is shaped according to a particular slice of a 3D model, such that the resin 105 cures to form a layer of the 3D object having the same shape. In some embodiments, the projector could be a standard consumer projector having its UV filter removed. Other types of projectors are also possible.

In a further aspect, it may be desirable to agitate the surface of the resin 105 during the 3D printing process. Specifically, agitating the surface of the resin may improve the 3D printing process by, e.g., improving the uniformity of the layers in the printed object. Thus, in some embodiments, such as that shown in FIG. 1, a scraper 114 may be implemented in resin container 102. The scraper 114 may be operable to move across the resin container 102, in order to agitate the surface of the liquid resin 105.

For example, the scraper 114 may be operated to periodically agitate or "scrape" the surface of resin 105 during the process of 3D printing an object, such as after the formation of each layer, or according to some predetermined interval. In some implementations, the scraper 114 may be operated manually by a human. Additionally or alternatively, the scraper 114 may be automated (e.g., motorized), such that a control system 110 can automatically operate the scraper during the 3D process. For example, a control system 110 may automatically move the scraper across the resin container 102 after the curing of each layer is completed.

The build volume of an example system, such as 3D printer system 100, may be defined at least in part by the range of movement and/or the reach of the robotic device to which the base plate is mounted. For example, in FIG. 1, the build volume may be defined by the range of movement of the robotic arm 106. Other examples are possible.

Further, example embodiments, such as the 3D printer system 100, may allow for the creation of objects that are much larger than those that can be created in a 3D printer where the build volume is defined by the dimensions the pan (e.g., the surface area of resin container 102) and/or by the surface area of the base plate.

For example, consider Figures IC to IF, which collectively illustrate the movement of the robotic arm 106 from an example 3D printer system 100, during the process of 3D printing an arch-shaped object 112. More specifically, FIGS. IC to IF show the state of the arch-shaped object 112 at various stages of the 3D printing process, progressing chronologically from FIG. IC to FIG. 1F. During this process, the robotic arm 106 moves the base plate 108 along a curvature, in order to create the arch-shaped object 112. Since the build volume is defined at least in part by the robotic arm's range of movement, the 3D printer is able to create an arch-shaped object 500 extends well beyond the edges of the resin container.

Further, example embodiments, such as 3D printer system 100, may allow for creation of objects with non-parallel layers. Specifically, when the base plate is mounted on a robotic device with two or more degrees of freedom, such as the robotic arm 108, the robotic device can vary pose of the base plate, and thus the pose of the in-progress object, with respect to the surface of the resin 105, such that layers of the object are angled with respect to one another. For example, the angle of the base plate may be changes at various times during the 3D printing process shown in FIGS. 1C to 1F, such that at least some of the layers in the arch-shaped object 112 are wedge-shaped.

Additionally or alternatively, a system such as 3D printer system 100 may allow for creation of objects with less support structures than would typically result from other 3D printing techniques (e.g., structures such as arches or other objects with an overhang that would typically include supports). When support structures need to be removed after 3D printing an object, this can add time and/or manual labor to the process, and can result in imperfections at locations where supports are removed. Thus, a printer such as 3D printer system 100 may be able to produce objects with smoother surfaces, as compared to other types of 3D printers.

For example, in a system where the base plate does not suspend the object from above the resin container, printing an arch, or another object with an overhang, might require that supports be created for the arch or overhang during the 3D printing process. However, when the base plate suspends an object over the resin container, such as in 3D printer system 100, such supports may not be required.

In some cases, the ability to print non-parallel layers may make it easier to create curved objects, such as the arch-shaped object 112 shown in FIGS. 1C to 1F. Additionally or alternatively, by changing the orientation of layers within a 3D printed object, it may be possible to intelligently control characteristics of the object such as structural rigidity, elasticity, etc. Accordingly, a 3D printer system 100 may allow for more flexibility in specifying the structural characteristics of an object being printed. For example, a 3D printer system 100 may be used to create a more stable structure (e.g., a structure that can manage higher compression loads). Other examples are also possible.

Referring again to FIG. 1A, a 3D printer system 100 may also include or be communicatively coupled to a control system 110. A control system 110 may take the form of or include executable program logic, which may be provided as part of or in conjunction with a 3D printer system 100. Such program logic may be executable to, e.g., generate control signals for a 3D printer system 100. For example, a number of program-logic modules may be included as part of a control system, such as control system 110.

In an example embodiment, control system 110 may be operable to: (a) receive data include a three-dimensional model of an object or structure, and (b) based at least in part on the 3D model, generate control signals that coordinate movement of the base plate 108 (via control of the robotic device 106) with the operation of the light source 104 to form the object 112 specified by the 3D model in a layer-by-layer manner. In particular, each layer of resin in the object 112 is formed by exposure of resin in the resin container to electromagnetic radiation from the light source.

FIG. 1B shows example program logic modules for interfacing with and controlling a 3D printer system. In particular, a 3D-modeling application 150 and corresponding GUI 152 may allow for 3D model generation. Further, to prepare the 3D model for printing, a model-processing module 154 may apply a slicing process to the 3D model. For example, various techniques may be used to define an isosurface mesh for a 3D model, which may then be sliced into layers. Other examples are also possible.

The slicing process may slice the 3D model into segments, which each correspond to a layer, such that the object portrayed by the 3D model can be generated layer by layer from the segments of the 3D model. In addition, the 3D model may be sliced along non-parallel planes, such that some or all of the segments have opposing surfaces that are non-parallel.

The segmented 3D model may then be passed to both: (i) a robot-control module 156, which may generate robot control signals, and (ii) an image coordination module 158, which may generate image control signals signal for 3D printing, including image files and light-source control signals, in order to print a 3D object based on the 3D model. Further, note that the robot control module 156, the image coordination module 158, and/or other program logic modules may coordinate the timing of the robot control signals with the timing of the image control signals, so that the 3D printing process is properly carried out.

Other types of 3D printers are also possible. For example, a 3D printer may be configured for stereolithography using a base plate that is only movable upwards and downwards (i.e., with one degree of freedom). In other embodiments, a 3D printer may be configured for stereolithography using a base plate that is moveable with two degrees of freedom; e.g., vertically movable (i.e., upwards and downwards) and horizontally moveable (e.g., parallel to the surface of the resin in the resin container). Other examples and configurations of 3D printers are also possible.

Figure 1G:
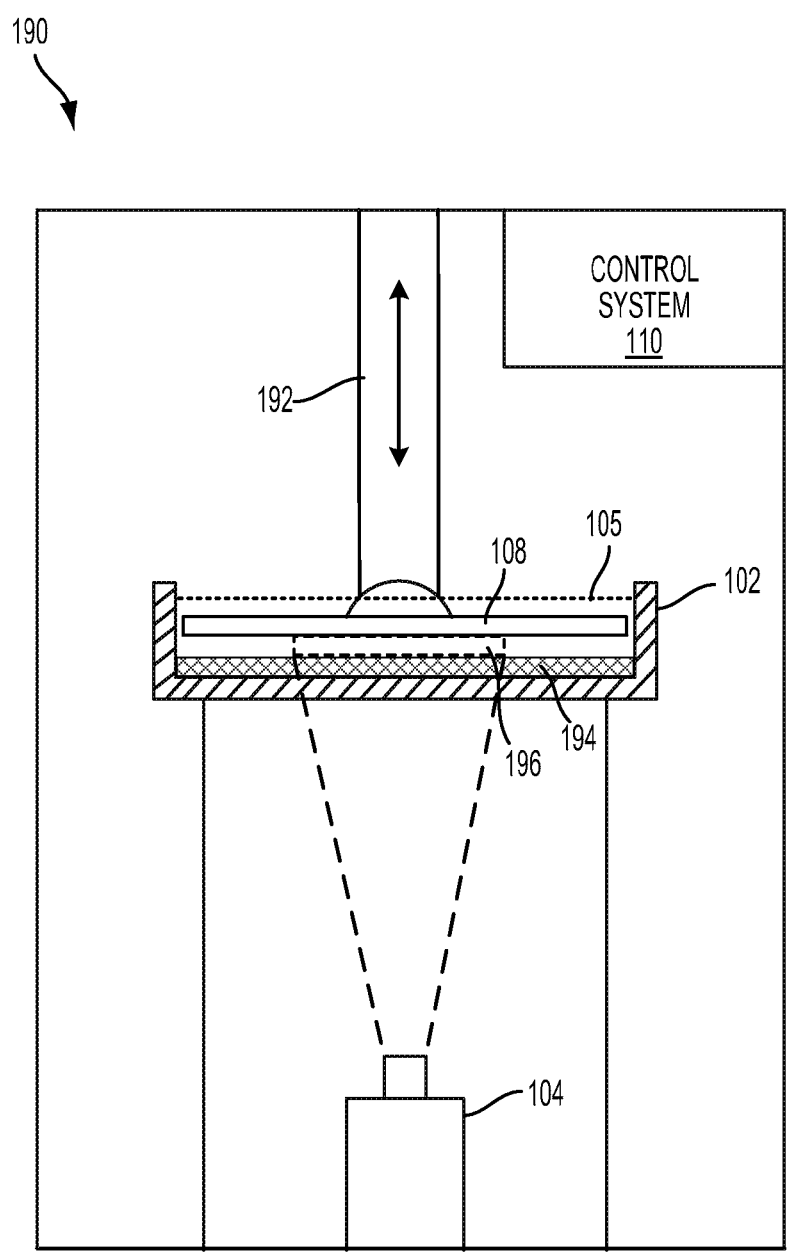
FIG. 1G shows another three-dimensional printer system, according to an example embodiment.

FIG. 1G illustrates another 3D printer 190, according to an example embodiment. 3D printer 190 includes a base plate mechanism 192 that is operable to move the base plate 108 upwards and downwards (i.e., with one degree of freedom). Note that base plate 108, resin 105, resin container 102, light source 104, and/or control system 110 shown in FIG. 1G may be the same as or different from the like-numbered aspects shown in FIG. 1A. Further, note that the control system 110 in 3D printer 190, and control systems for other 3D printers, may generally include some form of non-transitory computer readable medium (e.g., some form of memory or data storage), with program instructions that are executable to carry out a 3D printing process.

3D printer 190 also includes a substrate 194 on the bottom of the resin container. The substrate 194 may be formed from material that allows UV radiation from the light source 104 to pass through to the liquid resin 105. For example, substrate 194 may be formed from a layer of clear or semi-transparent material such as Polydimethylsiloxane (PDMS). To print each layer of an object, the base plate 108 may be positioned in the liquid resin 105, above the substrate 194. More specifically, the base plate 108 may be positioned such that the distance between the bottom of the base plate 108 and the top of substrate is substantially equal to the desired height of the layer being cured. In this context, "substantially equal" should be understood to mean that the separation is such that a layer of a desired height can be formed when the liquid resin between the base plate and substrate is cured; e.g., a separate that is equal or perhaps slightly greater than the desired height of the layer being cured (1 mm or slightly greater than 1 mm, if a layer of 1 mm is desired, for instance). A layer 196 of the 3D object may then be formed by exposing the liquid resin that is between base plate 108 and substrate 194 to UV radiation from light source 104.

In some embodiments, substrate 194 may be formed from Teflon or other similar materials, such as Polymethylpentene film, instead of from PDMS. Teflon has similar adhesive characteristics as PDMS; e.g., cured resin does not significantly adhere to either material, which thus allows for cured resin to be easily removed from the substrate once a layer is complete. However, Teflon tends to dissipate heat more efficiently than PDMS. As a result, the internal temperature of PDMS substrate may increase more during the course of a 3D printing process, than the internal temperature of Teflon substrate does during a comparable 3D printing process. When the temperature of PDMS substrate increases, it may become more difficult to remove cured resin from the PDMS substrate. Therefore, Teflon may allow for cleaner separation of a cured resin layer from the substrate.

III. ILLUSTRATIVE METHODS

Figure 2:
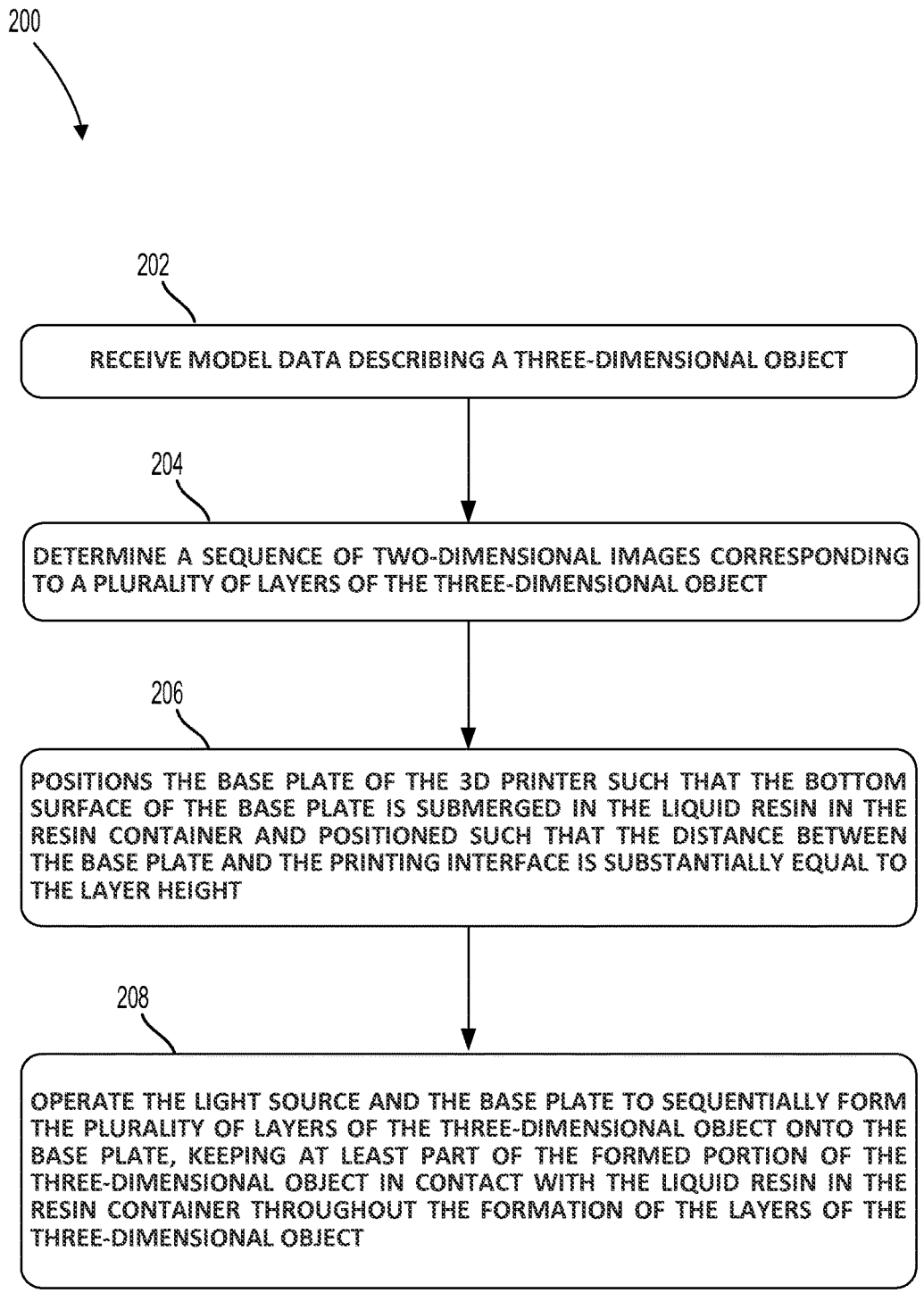
FIG. 2 is a flow chart illustrating a three-dimensional printing method, according to an example embodiment.

FIG. 2 is a flow chart illustrating a 3D printing method 200, according to an example embodiment. Method 200 may be implemented by a control system of a 3D printer. For instance, method 200 may be implemented for stereolithography by a 3D printer that includes a resin container arranged to hold liquid resin, a base plate, and a light source arranged below the resin container, which is controllable to emit electromagnetic radiation and selectively cause portions of the liquid resin to cure. Of course, example methods, such as method 200 may be implemented by other types of 3D printers and/or by control systems for other types of 3D printers.

As shown by block 202, method 200 involves the control system receiving model data describing a three-dimensional object. For example, block 202 may involve the control system receiving a file that describes an object for purposes of 3D printing, such as a Standard Tessellation Language (STL) file, an Object (OBJ) file, or a Polygon (PLY) file, among other possibilities. The control system may then determine a sequence of two-dimensional (e.g., cross-sectional) images corresponding to a plurality of layers of the three-dimensional object, as shown by block 204. For instance, at block 204, a software- or firmware-based "slicer" may process the 3D model file to generate a sequence of layers and output a file with instructions for the particular 3D printer (e.g., a G-code file).

Once the control system has determined the sequence of layers to be printed, the control system positions the base plate such that the 3D printing can begin. More specifically, at block 206, the control system positions the base plate of the 3D printer such that the bottom surface of the base plate is submerged in the liquid resin in the resin container. In particular, the base plate may be positioned in the liquid resin, just above a substrate at the bottom of the resin container. For example, the base plate may be positioned such that the distance between the bottom of the base plate and the printing interface (e.g., the top of a substrate in the resin container) is substantially equal to the desired height of the layer being cured, such as described in reference to FIG. 1G above.

Then, as shown by block 208, the control system then operates the light source and the base plate (e.g., by controlling the mechanical features to which the base plate is attached) to sequentially form the plurality of layers of the three-dimensional object onto the base plate, keeping the formed (e.g., cured) portion of the three-dimensional object in contact with the liquid resin in the resin container throughout the formation of the plurality of layers of the three-dimensional object.

Importantly, according to method 200, when the base plate moves the formed portion of the three-dimensional object upward after the formation of each layer, the formed portion of the three-dimensional object remains in contact with the liquid resin in the resin container. As such, the cured portion of the in-progress object (e.g., at least the most-recently cured surface) may remain in contact with the liquid resin throughout the entire 3D printing process. Thus, the 3D printer does not remove the cured portion of the object from the liquid resin after each layer is formed. As a result, the 3D printing process may be completed in less time than would be required if the cured portion of the object is completely removed from the liquid resin after each layer is cured (e.g., in order to leave an air gap between the most-recently cured surface of the object and the resin, such that the surface of the resin can be agitated).

Figure 3:
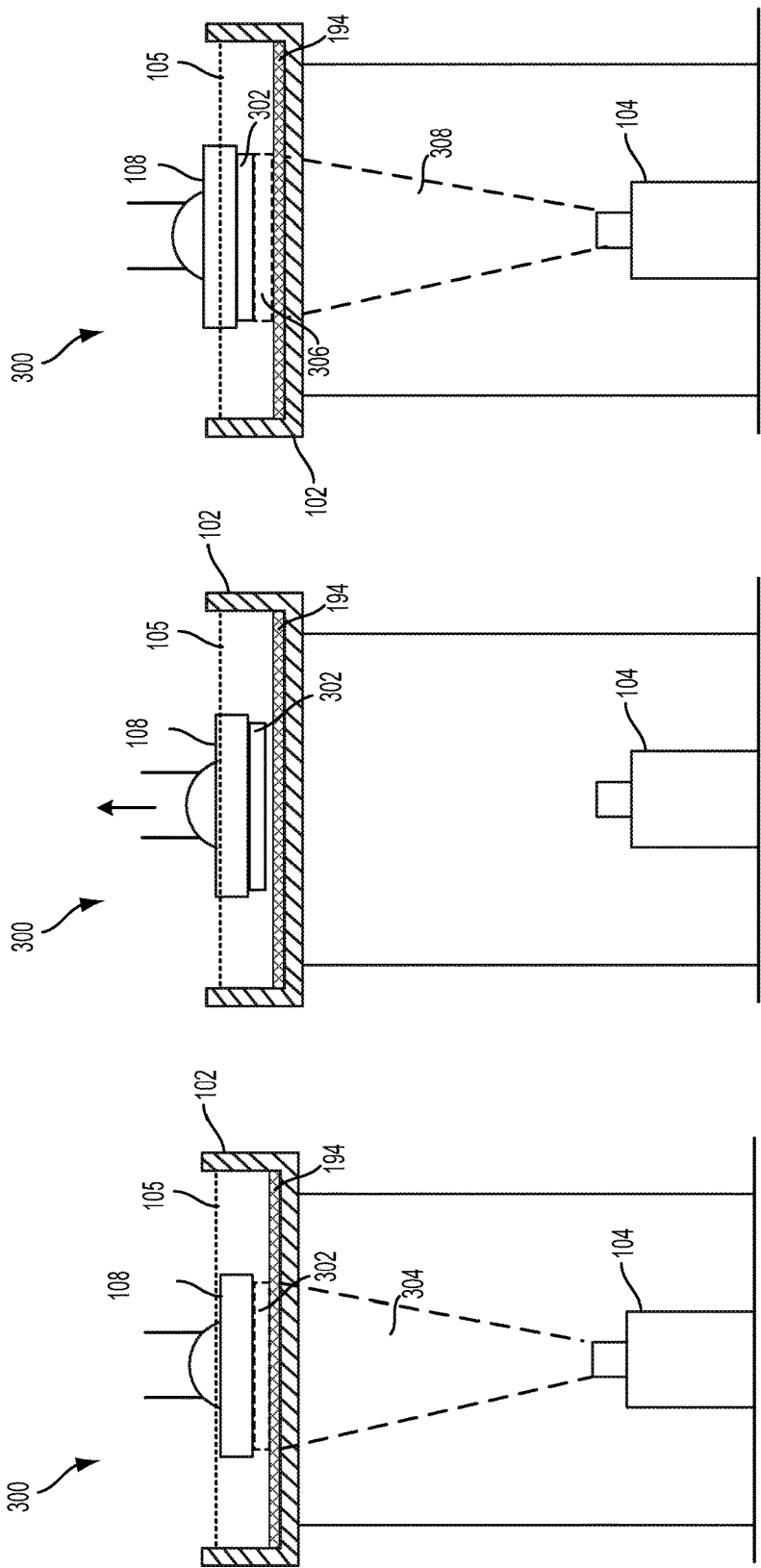
FIGS. 3A to 3C illustrate an operational sequence in which two layers of an object are printed, according to an example embodiment.

FIGS. 3A to 3C illustrate a sequence in which two layers of an object are printed according to an example method, such as method 200. In particular, FIG. 3A shows a 3D printer 300 with a base plate 108 that is in an initial position, and ready to print the first layer of an object onto the bottom surface of the base plate 108. Such positioning may occur, e.g., at block 206 of method 200. In FIG. 3A, the light source 104 projects a first shape 304 that is specified for the first layer 302. The first shape 304 may be projected towards the bottom surface of the base plate 108 for an appropriate amount of time to achieve a layer having a desired thickness. The first layer 302 is shown with dotted lines to indicate that first layer is being formed (i.e., cured) during the time period illustrated in FIG. 3A.

When the first layer has been formed, the base plate 108 may be moved upwards, as shown in FIG. 3B. Note that in FIG. 3B, the first layer 302 is cured and thus is shown with solid lines. Further, once cured, the first layer 302 adheres or otherwise attaches to the base plate 108. Thus, when the base plate 108 is moved upwards, the first layer 302 is also pulled upwards. However, when an example method 200 is implemented, the base plate 108 does not pull the entire first layer 302 out of the liquid resin 105. Rather, the upward movement of the base plate is such that at least the lower surface of the first layer 302 remains in contact with the liquid resin 105.

Further, when the first layer has been formed, the light source 104 may be switched off, as shown by the lack of a projection in FIG. 3B. In practice, the duration for which a projector is switched off between the curing of two layers may vary. In some cases, a longer duration of a number of seconds or a number of minutes is possible. In other cases, a shorter duration is possible. For instance, the light source may be switched off for duration on the order of a number of tenths of a second, or a number of milliseconds. In other implementations, it is possible that the light source may not turn off between the curing of two layers. For example, a light source could transition immediately, or as fast as physically possible, from projecting the shape corresponding to a first layer to projecting the shape corresponding to the immediately subsequent layer. Other timing examples and variations for transitioning between layers during 3D printing are also possible.

In a further aspect, once the first layer 302 is formed, various techniques and/or configurations may be used to help achieve smoother surfaces on the resulting 3D-printed object and/or help to improve the 3D printing process in other ways. Such techniques can be performed before the base plate 108 moves the first layer 302 upward, while the base plate 108 is moving the first layer 302 upwards, and/or after the base plate 108 moves the first layer 302 upwards. Examples of such techniques and configurations are described below in reference to FIGS. 4A to 4C, 5, 6, 7A to 7C, 8, 9A, and 9B.

Further, once the base plate pulls the first layer 302 upwards, the second layer 306 of the object may be formed on the lower surface of the first layer 302, as shown in FIG. 3C. In particular, the light source 104 projects a second shape 308, which is specified for the second layer 306, towards the lower surface of the first layer 302, such that the second layer 306 forms in the second shape. Further, when block 208 of method 200 is implemented, the process illustrated in FIGS. 3B and 3C may be repeated to form the subsequent layers of the object.

A. Continuous-Pull 3D Printing with Printing Interface Provided by Separation of Liquid Resin and Second Liquid As noted above, an example stereolithography process may utilize a vat that is filled with a liquid resin and glycerin. The liquid resin and glycerin may have different specific gravities, such that they naturally separate, with the volume of liquid resin rising above the volume of glycerin. The natural separation of the resin and the glycerin may provide a flat (e.g., planar) "interface" on the plane where the volumes of the separate liquids meet. As such, to form each layer during some example 3D printing processes, the base plate may be positioned at the resin-glycerin interface and resin may be cured to form the layer.

Further, liquid resin may have a lower viscosity than the second liquid in the resin container, which may provide for easier removal of each cured layer from the printing interface. For example, the use of glycerin to provide a lower volume of liquid in the resin container may reduce the surface tension at the interface, as compared to other types of liquids (e.g., water), and or as compared to using solid substrates to provide a printing interface. The reduction of surface tension may result in 3D-printed objects that have smoother surfaces.

Figure 4:
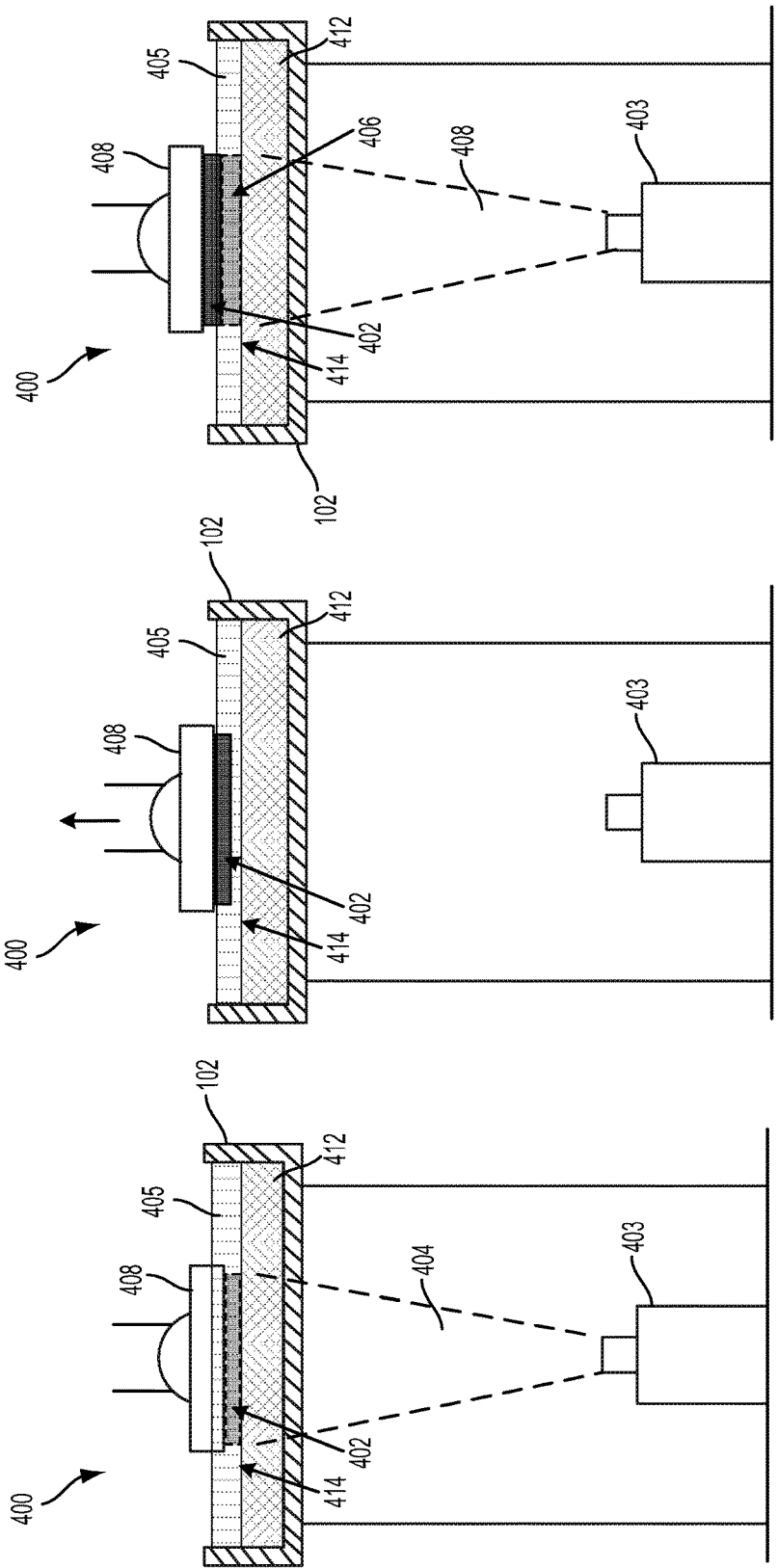
FIGS. 4A to 4C illustrate another operational sequence of a three-dimensional printer in which two layers of an object are formed, according to an example embodiment.

FIGS. 4A to 4C illustrate an operational sequence of a 3D printer 400 in which two layers of an object are formed. In the illustrated example, the resin container 102 of the 3D printer 400 is filled with two liquids having different viscosities. In particular, the resin container 102 of 3D printer 400 holds a volume of liquid resin 405 and a volume of a second liquid 412 having a different viscosity and specific gravity than the liquid resin. As noted the second liquid 412 may be glycerin such that the second liquid naturally separates from the resin, and thus provides a substantially planar printing interface 414 in the plane where the separation of the liquid resin 405 and the second liquid 412 occurs.

In an example embodiment, a continuous-pull 3D printing process may be implemented by a 3D printer such as that shown in FIGS. 4A to 4C, e.g., which prints from a vat with an upper volume of liquid resin that naturally separates from a volume of glycerin. In such an embodiment, after each layer is cured, the base plate may only be pulled upward, away from the resin-glycerin printing interface, by enough to allow for the next layer to be cured below the previously cured layer. As a result, it may be possible for the 3D-printed object to be completed without the need to completely remove the object from the liquid resin in between the printing of consecutive layers of the object.

Figure 5:
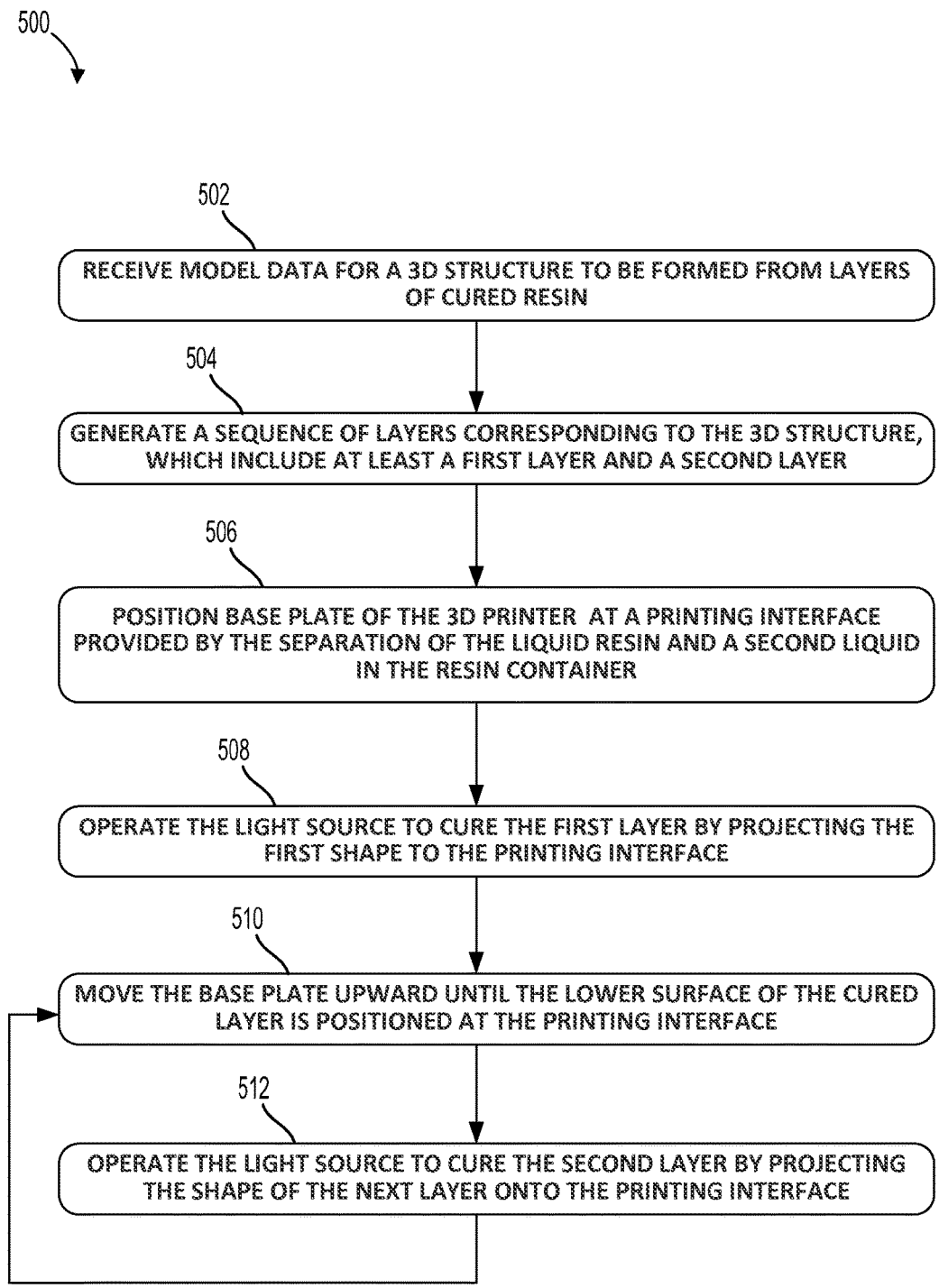
FIG. 5 is a flow chart illustrating a three-dimensional printing method in a resin container with a printing interface provided by the separation of liquid resin and a second liquid, according to an example embodiment.

FIG. 5 is a flow chart illustrating a 3D printing method 500 in a resin container with a printing interface provided by the separation of liquid resin and a second liquid, according to an example embodiment. Method 500 may be implemented by a 3D printer configured in the same or similar manner as 3D printer 400 shown in FIGS. 4A to 4C (e.g., by a control system of such a 3D printer). Of course, it should be understood that method 500 may be implemented by other types of 3D printers and/or by control systems for other types of 3D printers, without departing from the scope of the invention.

As shown by block 502, method 500 involves the control system receiving model data for a 3D structure to be formed from layers of cured resin. The control system then generates a sequence of layers corresponding to the 3D structure, which include at least a first layer and a second layer, as shown by block 504. In so doing, the control system may determine a particular shape for each layer, such that the layers stack to form the 3D structure. As such, the first layer may have a first shape and the second layer may have a second shape, which could be the same or different from one another.

The base plate of the 3D printer is then positioned at the printing interface provided by the separation of the liquid resin and the second liquid, as shown by block 506. For example, referring back to FIG. 4A, the base plate 408 is positioned for formation of the first layer of the 3D object.

In particular, base plate 408 is positioned such that the lower surface of the base plate is submerged in the volume of liquid resin 405 in the resin container and positioned at the interface 414.

Note that when base plate 408 is described as being positioned "at the interface" (or "at the printing interface") between liquid resin 405 and another liquid 412 below the resin, this should be understood to mean that the base plate is positioned just above the interface, with a separation from the interface that is substantially equal to the height of the layer being cured. In this context, "substantially equal" should be understood to mean that the separation is such that a layer of a desired height will result when the liquid resin between the lower surface of the base plate and interface is cured; e.g., equal or perhaps slightly greater than the desired height of the layer being cured (1 mm or slightly greater than 1 mm, if a layer of 1 mm is desired, for instance).

Referring again to method 500, once the base plate is positioned at the printing interface, the control system may operate the light source to cure the first layer by projecting the first shape to the printing interface, as shown by block 508. For example, referring to FIG. 4A, UV projector 403 is switched on to form the first layer 402. In particular, a projection 404 in the shape of the first layer is projected towards the interface 414, such that the liquid resin between the lower surface of the base plate 408 and the interface 414 cures in the desired shape, and thus forms the first layer 402. The first layer 402 is shown with dotted lines to indicate that first layer is being formed (i.e., in the process of curing) during the time period illustrated in FIG. 4A.

Continuing with method 500, after forming the first layer, the control system may move the base plate upward until the lower surface of the first layer is positioned at the printing interface, as shown by block 510. As such, the lower surface of the first layer may be positioned just above the plane where the liquid resin and the second liquid separate. For instance, once the first layer has been formed, base plate 408 may be moved upwards, as shown in FIG. 4B. Note that in FIG. 4B, the first layer 402 is cured, and thus is shown with solid lines. Further, once cured, the first layer 402 adheres or otherwise attaches to the base plate 408. Thus, when the base plate 408 is moved upwards, the first layer 402 is also pulled upwards. However, when an example method such as method 200 or method 500 is implemented, the base plate 408 does not pull the entire first layer 402 out of the liquid resin 405 after it is cured. Rather, the upward movement of the base plate is such that at least the lower surface of the first layer 402 remains in contact with the liquid resin 405.

Further, when the first layer 402 has been fully cured, the light source 403 may be switched off, as shown by the lack of a projection in FIG. 4B. In practice, the duration for which a projector is switched off between the curing of two layers may vary. In some cases, a longer duration of a number of seconds or a number of minutes is possible. In other cases, a shorter duration is possible. For instance, the light source 403 may be switched off for duration on the order of a number of tenths of a second, or a number of milliseconds. In other implementations, it is possible that the light source 403 may not turn off between the curing of two layers. For example, a light source 403 could transition immediately, or as fast as physically possible, from projecting the shape corresponding to each layer for the object, to projecting the shape corresponding to the next layer of the object. Other timing examples and variations for transitioning between layers during 3D printing are also possible.

Referring again to method 500, once the lower surface of the first layer is positioned at the printing interface, the control system operates the light source to cure the second layer (e.g., the next layer in the sequence) by projecting the second shape onto the printing interface 414, as shown by block 512. For example, as shown in FIG. 4C, once the base plate pulls the first layer 402 upwards, the second layer 406 of the object may be formed on the lower surface of the first layer 402. In particular, the light source 403 projects a second shape 408, which is specified for the second layer 406, towards the lower surface of the first layer 402, such that the second layer 406 cures in the second shape between the lower surface of the first layer 402 and the printing interface 414. Further, when block 512 is implemented, the process illustrated in FIGS. 4B and 4C may be repeated to form the subsequent layers of the object.

Note that specific combination of glycerin and resin could be used in printer configurations other than those described herein, and/or used with other types of 3D printing processes.

B. Continuous-Pull 3D Printing with Periodic Vibration of Resin Container

In some embodiments, a 3D printer may be configured to vibrate the resin container that holds the liquid resin during the 3D printing process. Further, doing so may allow the 3D printer to keep at least the bottom surface of the in-progress object in contact with the liquid resin throughout the printing process (e.g., without entirely removing the in-progress object from the liquid resin after each layer is completed), with improved results as compared to a continuous-pull 3D printing process that doesn't vibrate the resin container (or take some other action) to periodically agitate the liquid resin during the printing process.

Figure 6:
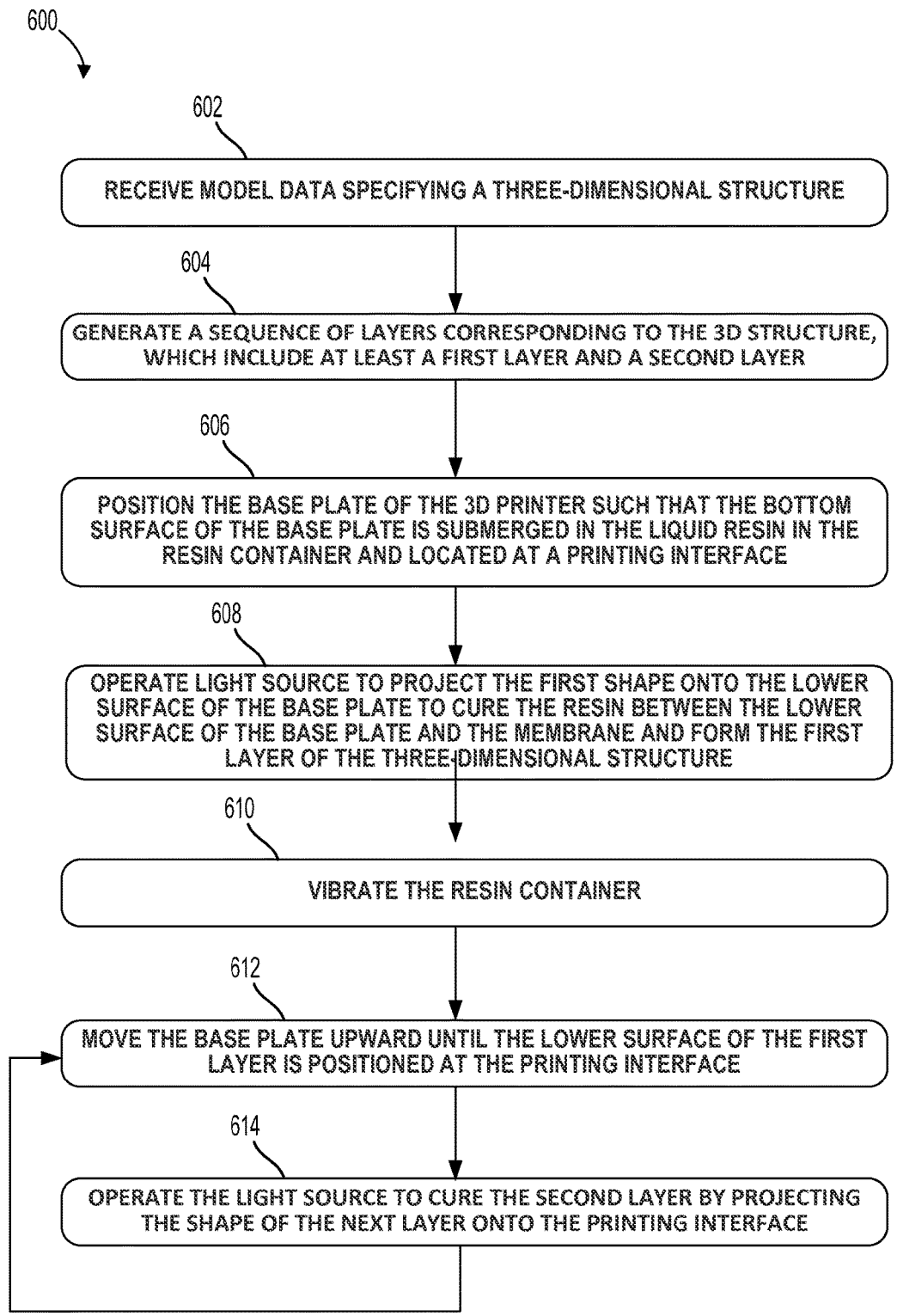
FIG. 6 is a flow chart illustrating a three-dimensional printing method that utilizes a vibrating resin container, according to an example embodiment.

FIG. 6 is a flow chart illustrating a 3D printing method 600 that utilizes a vibrating resin container, according to an example embodiment. Method 600 may be implemented by a 3D printer that is configured in the same or similar manner as the 3D printer described in reference to FIGS. 7A to 7C (e.g., by a control system of such a 3D printer). Of course, it should be understood that method 600 may be implemented by other types of 3D printers and/or by control systems for other types of 3D printers, without departing from the scope of the invention.

Figure 7:
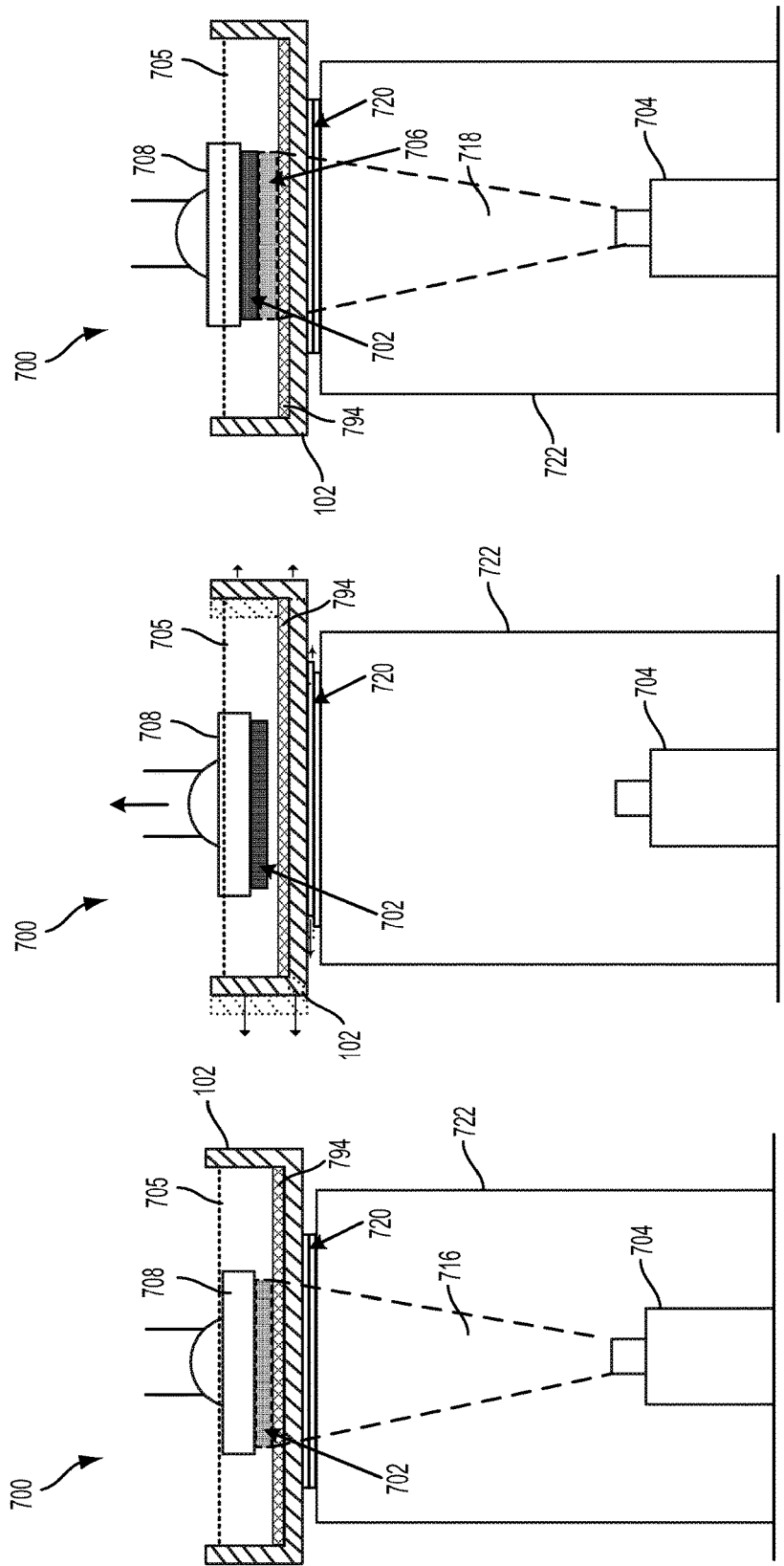
FIGS. 7A to 7C illustrate an operational sequence of a three-dimensional printer, during which two layers of an object are formed according to the method shown in FIG. 6.

FIGS. 7A to 7C illustrate an operational sequence of a 3D printer 700, during which two layers of an object are formed according to method 600. According to method 600, the resin container 702 of the 3D printer 700 vibrates in between the curing of two consecutive layers of the object. In such an embodiment, after each layer is cured, the base plate 708 may only be moved upward, away from the printing interface, by enough to allow for the next layer to be cured below the previously cured layer (e.g., between the bottom of the most-recently cured layer and substrate 794). As a result, it may be possible for the 3D-printed object to be completed without the need to completely remove the object from the liquid resin 705 in between the printing of consecutive layers of the object.

Referring again to FIG. 6, method 600 involves the control system receiving model data specifying a three-dimensional structure, as shown by block 602. The control system then generates a sequence of layers corresponding to the 3D structure, which include at least a first layer and a second layer, as shown by block 604. In doing so, the control system may determine a particular shape for each layer, such that the layers stack to form the 3D structure. Accordingly, the first layer may have a first shape and the second layer may have a second shape, which could be the same or different from one another.

Once the control system has determined the sequence of layers to be printed, the control system positions the base plate such that the 3D printing can begin. More specifically, as shown by block 606, the control system positions the base plate of the 3D printer such that the bottom surface of the base plate is submerged in the liquid resin in the resin container and positioned at a printing interface. In particular, the base plate may be positioned in the liquid resin, just above a substrate (e.g., a PDMS or Teflon substrate) at the bottom of the resin container. For example, FIG. 7A shows the base plate 708 that in a positioned and ready for the printing of the first layer of an object. In particular, base plate 708 is positioned such that the distance between the bottom of the base plate 708 and the top of substrate 794 is substantially equal to the desired height of the layer being cured.

Continuing with method 600, once the base plate is positioned just above the substrate, the control system may operate the light source to project the first shape onto the lower surface of the base plate, which cures the resin between the lower surface of the base plate and the substrate to form the first layer of the three-dimensional structure, as shown by block 608. For instance, in FIG. 7A, the light source 704 projects the first shape 716 that is specified for the first layer 702. The first shape 716 may be projected towards the bottom surface of the base plate 708 for an appropriate amount of time to achieve a layer having a desired thickness. The first layer 702 is shown with dotted lines to indicate that first layer is being formed (i.e., cured) during the time period illustrated in FIG. 7A.

Continuing now with method 600, after curing the first layer, the control system: (i) vibrates the resin container, as shown by block 610, and (ii) moves the base plate upward until the lower surface of the first layer is positioned above the printing interface, as shown by block 612. For example, as shown in FIG. 7B, once the first layer of the object has been cured, the base plate 708 is moved upwards and the resin container 102 is vibrated. In FIG. 7B, the vibration of resin container 102 is represented by the arrows on either side of resin container 102. The vibration of the resin container 102 may agitate the liquid resin in the resin container, which in turn may help allow for the first layer 702 to maintain contact with the liquid resin in between the printing of consecutive layers. Further, note that block 610 may involve vibrating the resin container 102 before, during, and/or after the upward movement of the base plate that is carried out at block 612.

In the illustrated example, a mechanical system 720 is operable to vibrate the resin container 102. In particular, mechanical system 720 includes an upper plate that is attached to the resin container 102, and a lower plate that is attached to a support structure 722 below the resin container 102. As shown in FIG. 7B, the upper plate may be controllably moved side to side, while the lower plate is held in a fixed position, in order to vibrate resin container 102. It should be understood that the illustrated mechanical system 720 is but one example of a system that may be utilized to vibrate the resin container. Other mechanical and non-mechanical systems for vibrating the resin container are possible.

Further, after block 612 of method 600 is carried out, the lower surface of the first layer 702 may be positioned in the liquid resin 705, just above the substrate 794 at the bottom of the resin container 102. In an example embodiment, the base plate 708 may be positioned such that the distance between the bottom of the first layer and the top of substrate is substantially equal to the desired height of the layer being cured.

Continuing with method 600, once the lower surface of the first layer is positioned at the printing interface, the control system operates the light source to cure the second layer of the object by projecting the second shape onto the printing interface (e.g., onto the lower surface of the first layer), as shown by block 614. According to an example embodiment, at least the lower surface of the first layer remains in continuous contact with liquid resin in the resin container between the curing of the first layer and the curing of the second layer.

For example, as shown in FIG. 7C, once the base plate pulls the first layer 702 upwards, the second layer 706 of the object may be formed on the lower surface of the first layer 702. In particular, the light source 704 projects a second shape 718, which is specified for the second layer 706, towards the lower surface of the first layer 702, such that the second layer 706 cures in the second shape between the lower surface of the first layer 702 and the substrate 794. Further, when blocks 610 to 614 are repeated, the process illustrated in FIGS. 7B and 7C may be repeated to form the subsequent layers of the object.

C. Continuous-Pull 3D Printing Process with Patterned Edges

As noted above, during a continuous-pull 3D printing process, various techniques may be used to achieve consistent printing results (e.g., smooth surfaces), without requiring that the cured resin be completely removed from the liquid resin. To do so, some embodiments may involve adding a pattern to the edge of each layer. Layers with patterned edge may help to reduce surface tension between a cured layer and the liquid resin, and thus can reduce inaccuracies that may occur due to the liquid resin "clinging" to the cured resin as the cured resin is pulled upward by the base plate.

Figure 8:
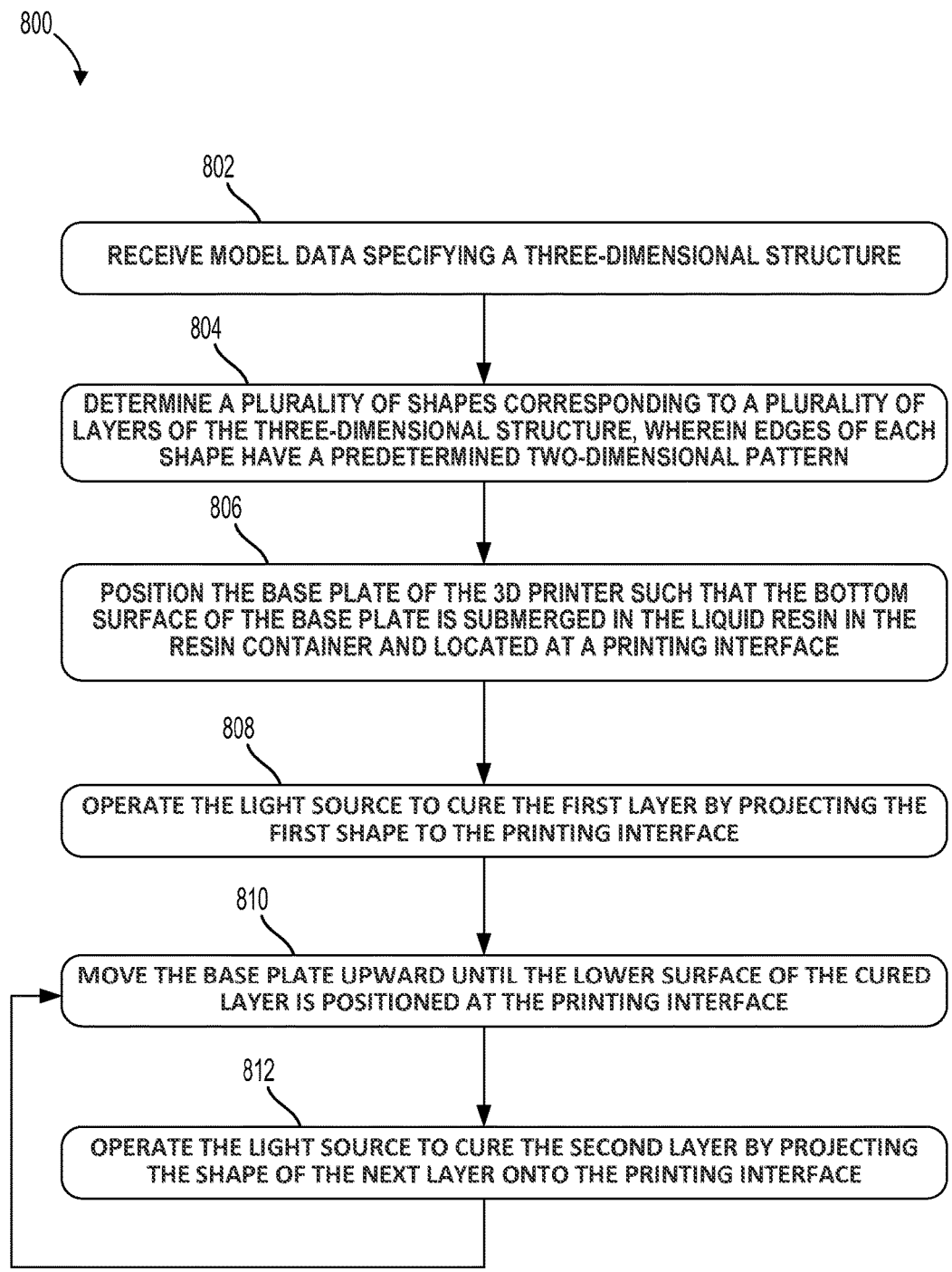
FIG. 8 is a flow chart is a flow chart illustrating a three-dimensional printing method that utilizes edge patterns for layers, according to an example embodiment.

FIG. 8 is a flow chart is a flow chart illustrating a 3D printing method 800 that utilizes edge patterns for layers, according to an example embodiment. Method 800 may be implemented by a 3D printer configured in the same or similar manner as the 3D printer described in reference to FIG. 1G (e.g., by a control system of such a 3D printer). Of course, it should be understood that method 900 may be implemented by other types of 3D printers and/or by control systems for other types of 3D printers, without departing from the scope of the invention.

As shown by block 802, method 800 involves a 3D printer's control system receiving model data describing a three-dimensional structure. The control system then determines a plurality of shapes corresponding to a plurality of layers of the three-dimensional structure, wherein edges of each shape have a predetermined two-dimensional pattern, as shown by block 804. In an example embodiment, the plurality of layers comprises at least a first layer having a first shape and a second layer having a second shape. Note that the edge pattern may not be indicated by the model data received at block 802. As such, implementing block 804 for a given layer may involve determining a shape for the given layer based on the model data, and then modifying the determined shape with the predetermined edge pattern.

Continuing with method 800, block 806 involves the positioning the base plate such that a surface of the base plate contacts liquid resin in the 3D printer's resin container. For example, referring to FIG. 1G, the base plate 108 may be positioned in the liquid resin 105, just above the substrate 194 (e.g., a PDMS or Teflon substrate) at the bottom of the resin container 102. Other examples are also possible.

Next, at block 808 of method 800, the control system operates the 3D printer's light source to project the first layer's shape onto the lower surface of the base plate to cure the first layer of the three-dimensional structure. For example, referring to FIG. 1G, in order to form the first layer 196 of the three-dimensional structure, light source 104 may project an image having the first layer's onto the printing interface to cure the resin between the lower surface of the base plate 108 and the substrate 194.

After forming the first layer, method 800 involves moving the base plate upward such that a lower surface of the first layer contacts resin in the resin container at the printing interface, as shown by block 810. For example, the base plate may be moved upward until the lower surface of the first layer is positioned in the liquid resin, just above the substrate in the resin container. In particular, the base plate may position the lower surface of the first layer such that the distance between the lower surface and the substrate is substantially equal to the desired height of the second layer. Other examples are also possible. The control system may then operate the 3D printer's light source to project the second shape onto the lower surface of the first layer and form the second layer of the three-dimensional structure, as shown by block 812. In an example embodiment, the lower surface of the first layer remains in contact with the liquid resin in the resin container between the formation of the first layer and the formation of the second layer. Further, to complete the printing process, blocks 810 and 812 may be repeated in order to cure any subsequent layers of the three-dimensional structure.

Figure 9A:
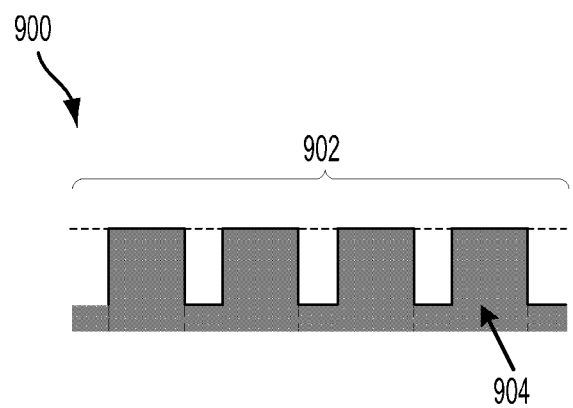
FIGS. 9A and 9B illustrate examples of edge patterns for layers of 3D-printed objects, according to an example embodiment.
Figure 9B:
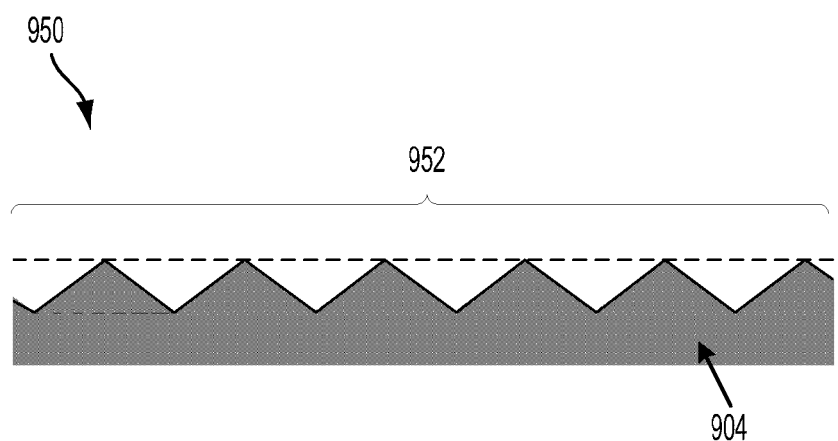

FIGS. 9A and 9B illustrate edge patterns for layers of 3D printed objects, according to an example embodiment. In particular, FIG. 9A shows a portion of an image 900 that may be used to cure a layer of a 3D object having "block" or "pixelated" edge pattern 904. It should be understood that the portion of the image 900 shown in FIG. 9A, may represent a small part of a larger image that is used to create a layer. To form a layer with such a pixelated edge pattern, a control system may begin with a layer shape having an edge 902, which is represented by the dashed lines in FIG. 9A. An image may then be generated for the layer in which the edge(s) of the layer's shape are modified to have the pixelated edge pattern 904. Accordingly, when a projector projects the image 900 of the shape into liquid resin, the edges of the resulting layer of cured resin will have the same pixelated edge pattern 904.

FIG. 9B shows a portion of an image 950 that may be used to cure a layer of a 3D object having triangular or "sawtooth" edge pattern 904. It should be understood that the portion of the image 950 shown in FIG. 9B, may represent a small part of a larger image that is used to create a layer. To form a layer with such a pixelated edge pattern, a control system may begin with a layer shape having an edge 952, which is represented by the dashed line in FIG. 9B. An image may then be generated for the layer in which the edge(s) of the layer's shape are modified to have the pixelated edge pattern 954. Accordingly, when a projector projects the image 950 of the shape into liquid resin, the edges of the resulting layer of cured resin will have the same pixelated edge pattern 954.

It should be understood that FIGS. 9A and 9B are provided for explanatory purposes and are not intended to be limiting. Other edge patterns are also possible. Further, it should be understood that edge patterns may be added to straight or curved edges, without departing from the scope of the invention.

Generally, it should be understood that the continuous-pull printing processes described herein may be applicable, in whole or in part, to other types of 3D printers. Further, those skilled in the art will understand that aspects of the continuous-pull printing processes may be inverted or otherwise applied to provide for improved "continuous push" 3D printing processes. In particular, aspects of methods described herein may be applied in a "continuous push" 3D printing process, where cured layers are pushed upwards by a continuous drip of a second liquid. For example, existing continuous-push processes, which utilize a water drip and liquid resin, could be modified to instead use a glycerin drip. Other examples are also possible.

IV. CONCLUSION

While various aspects of the disclosure have been disclosed herein, other aspects and embodiments will be apparent to those skilled in the art. Accordingly, the embodiments disclosed herein are for purposes of illustration, and are not intended to be limiting, with the true scope and spirit of the disclosure being indicated by the following claims.

What is claimed is:

1. A computer-implemented method for controlling a three-dimensional (3D) printer, comprising:
    (a) receiving model data describing a three-dimensional object;
    (b) determining a plurality of two-dimensional images corresponding to a plurality of layers of the three-dimensional object;
    (c) initially positioning a base plate such that a surface of the base plate contacts resin in a resin container;
    (d) operating the light source and the base plate to sequentially form the plurality of layers of the three-dimensional object onto the base plate, wherein the base plate moves a formed portion of the three-dimensional object upward after formation of each layer, and wherein at least a surface of a most recently formed layer of the three-dimensional object remains in contact with the resin in the resin container throughout the formation of the plurality of layers of the three-dimensional object,
    wherein operating the light source and the base plate to sequentially form the plurality of layers of the three-dimensional object onto the base plate comprises using a robotic device attached to the base plate from above to pull the base plate upward and away from the resin container during the formation of the plurality of layers of the three-dimensional object, wherein the robotic device comprises an articulated robotic alai whose range of movement defines a build volume, and wherein the robotic device positions the base plate above the resin container and operates to move the base plate with at least two degrees of freedom, such that the range of movement of the robotic arm extends beyond the edges of the resin container.

2. The method of claim 1, wherein the base plate, the resin container, and the light source are components of a 3D printer, wherein the base plate is arranged above a bottom surface of the resin container, and wherein the light source is arranged below the resin container.

3. The method of claim 1, comprising:
    initially positioning the base plate such that a surface of the base plate contacts resin in a resin container; and operating the light source to project a shape corresponding to a first of the plurality of layers into the resin in the resin container, wherein the projection of the corresponding shape forms the first of the plurality of layers in the corresponding shape at an interface between the surface of the base plate and the resin in the resin container.

4. The method of claim 3, wherein operating the light source and the base plate to sequentially form the plurality of layers of the three-dimensional structure onto the base plate further comprises:
   after forming the first layer of the 3D object, forming each subsequent layer of the three-dimensional structure by:
   (a) moving the base plate upward by a given distance, such that the base plate pulls the formed portion of the 3D object upward by the given distance; and
   (b) after moving the base plate upward by the given distance, operating the light source to project a shape corresponding to the subsequent layer into the resin in the resin container, wherein the projection of the corresponding shape forms the subsequent layer in the corresponding shape at an interface between the formed portion of the 3D project and the resin in the resin container.

5. The method of claim 3, further comprising turning off the light source after forming each layer and then turning the light source on in order to form the next layer.

6. The method of claim 1, wherein the resin in the resin container comprises a first liquid, and wherein the resin container further includes a second liquid having a different viscosity than the resin, such that the second liquid separates from the first layer and provides a substantially planar interface between the first liquid and the second liquid, and wherein each of the plurality of layers of the 3D object is formed at the substantially planar interface between the first liquid and the second liquid.

7. The method of claim 6, wherein the second liquid comprises glycerin.

8. The method of claim 1, wherein operating the light source and the base plate to sequentially form the plurality of layers of the three-dimensional object onto the base plate comprises:
   using a robotic device attached to the base plate from above to pull the base plate upward and away from the resin container during the formation of the plurality of layers of the three-dimensional object.

9. The method of claim 8, wherein the articulated robotic arm has six degrees of freedom.

* * * * *